Dec. 7, 1926.

R. R. BLOSS 1,609,288

GUDGEON STRUCTURE FOR TUBULAR SHAFTS

Filed April 9, 1924

Richard R. Bloss INVENTOR.

BY
Edwin P. Cortis ATTORNEY

Patented Dec. 7, 1926.

1,609,288

UNITED STATES PATENT OFFICE.

RICHARD R. BLOSS, OF COLUMBUS, OHIO, ASSIGNOR TO THE INTERNATIONAL DERRICK & EQUIPMENT COMPANY, OF COLUMBUS, OHIO, A CORPORATION OF OHIO.

GUDGEON STRUCTURE FOR TUBULAR SHAFTS.

Application filed April 9, 1924. Serial No. 705,390.

My invention relates to gudgeon structure for tabular shafts and has to do particularly with the provision of novel gudgeon structure and novel means for assembling and securing the gudgeon in the end of a tubular shaft whereby the gudgeon may be quickly interchanged or removed and at the same time producing a structure of maximum strength and extreme simplicity.

Permanently attached gudgeons, welded or riveted, obviously require a great deal more time, trouble and expense in replacing. It is not customary to find equipment around a drilling well adequate to make repairs on a fixed type of gudgeon. Therefore it becomes necessary to remove the structure on which the gudgeon is mounted, to a machine shop, where repairs can be made. This is, of course, very expensive from the standpoint of loss of time, of the entire drilling crew, and expense in connection with the haul, which may be a matter of miles through very rough, practically impassable oil country roads.

Various methods and means have been used for connecting and mountig various types of gudgeon structures to the ends of shafts. Some of these methods, when tubular shafts have been used, have involved the passing of long bolts through the entire length of the hollow shaft and thus securing the gudgeons together and to the shaft. Other methods have contemplated the holding of the gudgeon to the shaft by bolts which form a part of or are connected to the wheel or spoke structure or other element carried by the shaft.

The efforts toward the production of a gudgeon structure that would stand the weight and wear incidental to the operation of the shaft have varied with the particular structures and may be said to have met with considerable success but the efforts towards making of a gudgeon structure both solid and easily removable have been numerous and quite varied but there is still room for improvement. Furthermore, those gudgeon structures which are simple and comparatively inexpensible have been designed to be connected to the shaft in a permanent manner making them hard to remove and replace while those gudgeon structures which have been designed to be removed have been unduly complicated.

One object of my invention is the provision of a simple but strong gudgeon structure which may be easily and quickly secured to or removed from a tubular shaft but which will be firmly held both against tipping and rotation.

Another object of my invention is the provision of a gudgeon structure provided with suitable flanegs whereby it can be easily fitted into the end of a tubular shaft and means for easily and quickly securing the gudgeon to the shaft after it is fitted into place. In this case the easy removability of the gudgeon makes the inside of the tubular shaft readily accessible, which accessibility is very important particularly when it is desired to strengthen a bull wheel or calf wheel shaft by adding concrete or other materials to the interior.

A further object of my invention contemplates the provision of a specially formed bolt in combination with the gudgeon structure and which bolt is of such form that it is pivotally and removably carried by the cylindrical wall of the tubular shaft. The result is that the specially formed bolt structure can be easily inserted into or removed from its proper place in the tubular shaft and the gudgeon secured to the shaft by such bolts without sacrificing any strength necessary in gudgeon structures.

A still further object of my invention has to do with a novel method of connecting the gudgeon to the tubular shaft whereby the connecting means cooperates with the gudgeon itself to prevent relative movement between the gudgeon and the tubular shaft. My gudgeon structure is preferably formed with an internally extending tapered portion which fits into the tubular shaft and which tapered portion is provided around its circumference with a series of slots designed to register with and receive the specially formed bolts carried by the tubular shaft. The result is that as one end of the bolt structure is secured to the shaft wall and as the other end is positioned between the walls of the slot in the gudgeon, the gudgeon structure will be prevented from rotating in the shaft.

Various other objects of my invention will in part be obvious and will in part be pointed out hereinafter in the specification and claims, wherein like parts are indicated by like characters throughout the several figures of the drawings.

Figure 1:
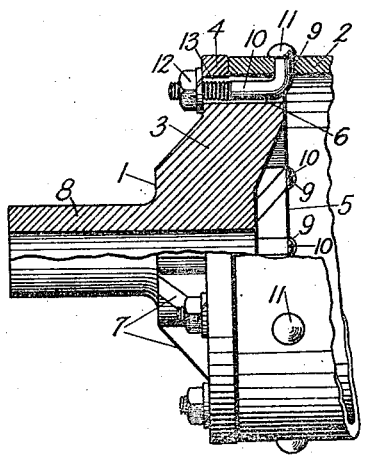
Figure 1 is a side elevation, partly in section, of one end of a tubular shaft provided with my novel gudgeon structure and also showing the manner of connecting and securing the gudgeon to the shaft.

In the drawings, my tubular shaft gudgeon structure is shown as comprising a gudgeon 1 which is designed to removably fit into the end of a suitable tubular shaft 2. It will be understood that the tubular shaft 2 is merely conventionally shown and may be of any standard construction. It will further be understood that although the gudgeon and shaft structure shown is designed to be used with calf wheel, sand reel and bull wheel shafts forming the parts of a drilling rig structure, such gudgeon may be of any size and form and be utilized with any type of tubular shaft requiring a strong and rigid trunnion.

Figure 2:
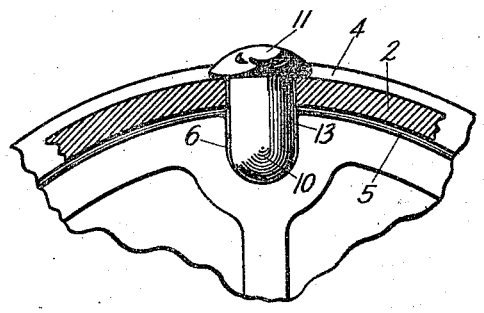
Figure 2 is a fragmentary end view of the structure shown in Figure 1 and showing the manner of positioning the gudgeon in the shaft and the relation between the bolts carried by the shaft and the slots in the tapered portion of the gudgeon.

In the preferred form of my invention the gudgeon 1 is shown as comprising a solid circular head which may be designated 3. This circular head 3 consists of a radially extending flange 4 which limits the distance to which the gudgeon can be inserted into the tubular shaft, and an inwardly extending and tapered projection 5. This inwardly extending projection or flange 5 centers the gudgeon when inserted in the shaft and takes all the shear at right angles to the axis of the shaft. As best shown in Figure 2, the inwardly extending tapered flange 5 is provided with a plurality of cored slots 6 which are arranged around the circumference of the flange 5. The outside of the gudgeon is preferably provided with a series of reinforcing ribs 7 and the trunnion which forms the journal part of the gudgeon and which may be of any desired size may be designated 8.

The tubular shaft 2 is preferably provided with a series of apertures or bolt holes 9 arranged in a single plane around the circumference thereof. These holes 9 are preferably of the same number as the slots 6 provided in the circumference of the gudgeon and such holes 9 are also preferably equally spaced in accordance with the spacing of the slots 6. A specially formed bolt 10 is designed to be inserted in one of the apertures 9 of the shaft 2, and as best shown in Figure 1, this bolt 10 is preferably L-shaped in form. The short end of the L being provided with an upset head 11 and the long end of the L being suitably threaded for the reception of a suitable nut 12. It will be understood that the aperture 9 is of such size and the angle or bend of the L-shaped bolt is of such form that such bolts may be easily removed from the shaft 2 when desired.

It will be understood that the radial extension 4 is provided with a series of holes or apertures 13 which register with the slots 6 in the tapered extension and that the L-shaped bolts when in registry with the slots 6 will pass through such apertures 13 whereby the nuts 12 may be placed upon the ends of the bolts 10 to secure the gudgeon to the shaft. It will be obvious that as the slots 6 are comparatively long that when the bolts 10 are in registry with such slots 6 the gudgeon will be prevented from rotating relative to the shaft 2. It will also be obvious that any rotation of the gudgeon would bring the specially formed bolts 10 into shear between the gudgeon and the tubular shaft.

The assembling of the gudgeon and tubular shaft is obviously very simple. When the tapered flange 5 is inserted in the end of the shaft 2 the gudgeon will be centered relative to the shaft and will also, by such action, be given a relatively tight fit with relation to such shaft. The slots 6 then being in longitudinal alinement with the bolt holes 9, the bolts 10 will pass through the slots 6 in the gudgeon and thence through the holes 13 in the flange 4. The nuts 12 may then be placed upon the ends of the bolts 10 and the gudgeon firmly and rigidly secured into place upon the shaft. The replacement or dismantling of the gudgeon is equally simple as it is only necessary to unscrew the nuts 12.

It will be seen that I have provided a novel and extremely simple type of gudgeon structure which is amply rigid and well adapted to heavy duty and which may be easily and quickly mounted upon the end of a tubular shaft. It will further be noted that the means for securing the gudgeon to the tubular shaft merely consists of a specially formed bolt, one end of which is directly carried by the shaft wall while the other end passes through the slot and aperture and the gudgeon. Thus, whenever breakage of the gudgeon or trunnion 8 occurs, such break may be very quickly repaired by loosening the nuts on the special bolts, slipping the broken gudgeon out of place and then readily inserting a new gudgeon and again placing the nuts 12 upon the ends of the special bolts.

Figure 4:
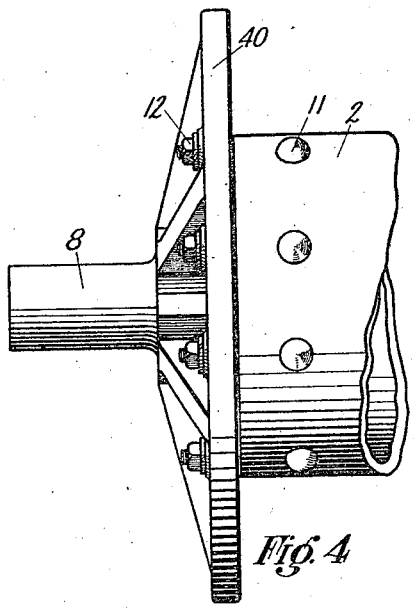
Figure 4 is a fragmentary side elevation of a modified form of gudgeon structure applied to a tubular shaft, the head of the gudgeon being provided with a flange of relatively large diameter.
Figure 3:
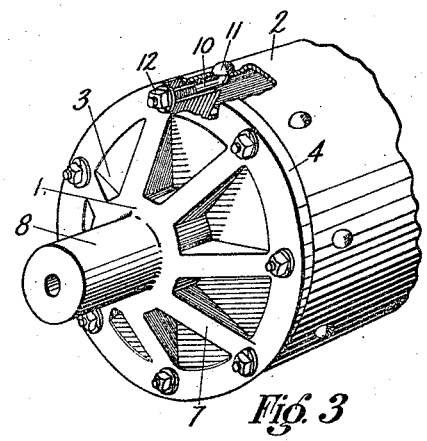
Figure 3 is a perspective view of the structure shown in Figure 1 and also showing the portion of the shaft and gudgeon broken away to illustrate the assembled relation of the parts.

In Figure 4 is shown a modification of the gudgeon structure in that the gudgeon is provided with a widened annular flange 40. This widened annular flange serves to form a flange of a spool such as is used on a sand reel or calf wheel.

It will be noted that by rendering the inside of the tubular shaft readily accessible that I have provided an arrangement whereby a smaller pipe may be inserted in the tubular shaft 2 and any part of the space within shaft 2 filled with concrete to reinforce the entire structure against bending and torsional strains as is sometimes necessary in the oil fields. Thus, by my structure this reinforcing of the tubular shaft may be accomplished any place and makes it unnecessary to provide any reinforcement except in cases where it is desirable.

It will further be obvious that the slots in the gudgeon structure so cooperate with the specially formed connecting bolts that the gudgeon is positively prevented from turning relative to the tubular shaft, thus, making it unnecessary to utilize keys or other fastening means. It will further be obvious that in case the specially formed bolts 10 should be sheared off that such bolts may be very easily replaced any place at any time.

Having thus described my invention, what I claim is:

1. In a device of the class described, a hollow shaft, a gudgeon removably applicable to the end of said shaft, and means supported at one end by the wall of said shaft and extending through the interior of said shaft for securing said gudgeon to said shaft.

2. In a device of the class described, a hollow shaft having openings about its periphery, a gudgeon removably applicable to the end of said shaft, and means disposed in each of said openings and extending through the interior of said shaft for securing said gudgeon to said shaft.

3. A device of the character described comprising a hollow shaft, a gudgeon having slots and openings in the periphery thereof and having an extension adapted to fit the shaft, and means secured to said shaft and passing through the slots and openings in said gudgeon for securing it to said shaft.

4. A device of the class described, a tubular shaft, a gudgeon adapted to fit in one end of said shaft including a tapered extension, and means supported at one end by the wall of said shaft passing through said extension to secure the gudgeon to the shaft.

5. A device of the character described, comprising a tubular shaft, and a gudgeon having slots in the periphery thereof, and bolts passing through the wall of said shaft and said slots for securing the gudgeon to the shaft.

6. In a device of the class described, a hollow shaft, a gudgeon removably applicable to the end of said shaft, and bolts having an integral connection with the shaft and connected to said gudgeon.

7. A shaft gudgeon comprising a flange adapted to abut against the end of a shaft, an internal flange adapted to extend into a hollow shaft, and a plurality of slots arranged around the circumference of said internal flange.

8. A device of the class described comprising a tubular shaft, a gudgeon, and L bolts passing through said shaft wall and the head of said gudgeon for securing the gudgeon to the shaft.

9. A device of the class described comprising a tubular shaft, a gudgeon, and L bolts passing through said shaft wall and slots formed in the head of said gudgeon for securing the gudgeon to the shaft.

In testimony whereof I hereby affix my signature.

RICHARD R. BLOSS.